US011467681B2

(12) United States Patent
Chou

(10) Patent No.: US 11,467,681 B2
(45) Date of Patent: Oct. 11, 2022

(54) TOUCH SCREEN HAVING GEL-BASED OPTICAL ADHESIVE LAYER

(71) Applicant: LUCENT ADVANCED MATERIAL CORP., New Taipei (TW)

(72) Inventor: Jui Shu Chou, New Taipei (TW)

(73) Assignee: Lucent Advanced Material Corp., New Taipei (TW)

( * ) Notice: Subject to any disclaimer, the term of this patent is extended or adjusted under 35 U.S.C. 154(b) by 207 days.

(21) Appl. No.: 16/896,398

(22) Filed: Jun. 9, 2020

(65) Prior Publication Data

US 2020/0393919 A1 Dec. 17, 2020

(30) Foreign Application Priority Data

Jun. 13, 2019 (TW) ................... 108120514
Sep. 20, 2019 (TW) ................... 108212440
Dec. 27, 2019 (TW) ................... 108148135
Dec. 27, 2019 (TW) ................... 108148137

(51) Int. Cl.
| | |
|---|---|
| G06F 3/041 | (2006.01) |
| C09J 9/00 | (2006.01) |
| B32B 7/12 | (2006.01) |
| B32B 3/30 | (2006.01) |
| B32B 37/12 | (2006.01) |
| B32B 38/00 | (2006.01) |

(52) U.S. Cl.
CPC ............. *G06F 3/041* (2013.01); *B32B 3/30* (2013.01); *B32B 7/12* (2013.01); *B32B 37/12* (2013.01); *B32B 38/0036* (2013.01); *C09J 9/00* (2013.01); *B32B 2457/208* (2013.01)

(58) Field of Classification Search
CPC .............. G06F 3/041; G06F 3/0412; G06F 2203/04103; G06F 1/1601
See application file for complete search history.

(56) References Cited

U.S. PATENT DOCUMENTS

| | | | | |
|---|---|---|---|---|
| 2008/0266273 A1* | 10/2008 | Slobodin | ............... | G06F 3/0446 |
| | | | | 345/173 |
| 2012/0108012 A1* | 5/2012 | Yasuda | ................... | H01L 24/29 |
| | | | | 428/192 |
| 2015/0009176 A1* | 1/2015 | Inata | ..................... | G06F 1/1637 |
| | | | | 345/174 |
| 2016/0145472 A1* | 5/2016 | Kwack | ................... | C09J 133/00 |
| | | | | 428/521 |
| 2018/0059821 A1* | 3/2018 | Wu | ....................... | H05K 9/0024 |
| 2020/0157387 A1* | 5/2020 | Kimura | ................... | B32B 27/00 |

FOREIGN PATENT DOCUMENTS

JP 2018-077491 * 5/2018

* cited by examiner

*Primary Examiner* — Saiful A Siddiqui
(74) *Attorney, Agent, or Firm* — Rosenberg, Klein & Lee

(57) ABSTRACT

The present invention relates to a touch screen that is assembled by a bonding process. The touch screen includes a display module including a frame and a displaying area; a touch panel configured above the display module and to receive a touch input; and a gel-based optical adhesive partially pre-cured prior to an implementation of the bonding process, interposed between and bonding the display module and the touch panel, and having a coverage larger than the displaying area and less than an outer edge of the frame and a ratio of transmittance larger than a percent of 91%.

19 Claims, 15 Drawing Sheets

| Items | Measurement methods and conditions | Value |
|---|---|---|
| Hardness | Test method: JIS K 2207<br>Fallen needle penetration | 100~120 (0.1mm) |
| Light transmittance | Test method: JIS K 7015<br>Wavelength of light: 380 nm<br>Gel thickness: 0.5 mm | 91% |
| | Test method: JIS K 7015<br>Wavelength of light: 780 nm<br>Gel thickness: 0.5 mm | 91% |
| Refractive index | Test method: JIS K 7142<br>Temperature: 23°C<br>Wavelength of light: 589 nm | 1.41 |
| Poisson's ratio | Test method: JIS K 7016 | 0.40~0.42 |
| Tensile strength at break | Test method: JIS K 6815-1<br>Gel thickness: 1.0 mm | 1.34~2.30 (N/mm) |
| Elongation at break | Test method: JIS K 6815-1<br>Gel thickness: 1.0 mm | 914~1292 (%) |
| Compression set | Test method: JIS K 6249 | 30~32 (%) |
| Peel strength with release liner | Test method: JIS Z 0237<br>Peel angle: 90°<br>Adhesive strength after 30 minutes of adhesion | 0.05~0.17 (N/20mm) |
| | | 0.7~0.9 (N/20mm) |
| Peel strength with PMMA | | 3.4~6.2 (N/20mm) |
| | | 3.5~4.7 (N/20mm) |
| Peel strength with soda lime glass | | 3.0~8.0 (N/20mm) |
| | | 5.2~9.0 (N/20mm) |
| Peel strength with polarizer | | 3.2~5.5 (N/20mm) |
| | | 2.8~4.5 (N/20mm) |
| Peel strength with polycarbonate | | 3.4~4.8 (N/20mm) |
| | | 3.3~4.6 (N/20mm) |
| Peel strength with PET | | 2.5~5.1 (N/20mm) |
| | | 3.1~4.0 (N/20mm) |
| Specific gravity | N/A | 1.01 |
| Young's modulus | N/A | 8~12 (kPa) |

FIG. 23

| Items | Measurement methods and conditions | Value |
|---|---|---|
| Thermal conductivity | Test method: JIS R 2616 | 0.18 (W/m · K) |
| Coefficient of expansion | Test method: JIS K 7197 | 8.0~8.62 ($10^{-4}$/K) |
| Volume resistivity | Test method: JIS K 6249 | $8 \times 10^{15}$ (Ω · cm) |
| Surface resistivity | Test method: JIS K 6249 | $3 \times 10^{15}$ (Ω) |
| Dielectric breakdown voltage | Test method: JIS K 6249<br>Gel thickness: 1.0 mm | 14.7~17.3 (kV) |
| Dielectric constant | Test method: JIS K 6249 at 50kHz | 2.79~2.8 |
| Dielectric constant | Test method: JIS K 6249 at 1kHz | 2.79~2.8 |
| Dielectric constant | Test method: JIS K 6249 at 1MHz | 2.79~2.81 |
| Dielectric dissipation factor | Test method: JIS K 6249 at 50kHz | 1.53~7.48 ($\times 10^{-4}$) |
| Dielectric dissipation factor | Test method: JIS K 6249 at 1kHz | 0.89~8.68 ($\times 10^{-4}$) |
| Dielectric dissipation factor | Test method: JIS K 6249 at 1MHz | 15.2~28.3 ($\times 10^{-4}$) |

FIG. 24

TOUCH SCREEN HAVING GEL-BASED OPTICAL ADHESIVE LAYER

CROSS-REFERENCE TO RELATED APPLICATION

The present application claims benefits to Taiwan invention patent application with a serial number 108120514, filed on Jun. 13, 2019, Taiwan invention patent application with a serial number 108212440, filed on Sep. 20, 2019, Taiwan invention patent application with a serial number 108148137, filed on Dec. 27, 2019, and Taiwan invention patent application with a serial number 108148135, filed on Dec. 27, 2019, and the entire disclosures of which the above Taiwan invention patent application are incorporated by reference herein.

FIELD

The present invention relates to a type of touch screen, in particular to a touch screen which contains in one or multiple gel-based translucent optical adhesive layers.

BACKGROUND

A touchscreen is a type of sensing display that simultaneously accepts a finger or a stylus to input control signals by touching a screen while the screen is displaying an image. Using an external touchscreen as an example, its basic structure is a touch panel adhered on the outside of a liquid crystal display module without touch functionality. In conventional technology, usually uses a full lamination technique is usually used for assembly.

The full lamination technique is a technology that fills in the irregular gap between the liquid crystal display module and the touch panel with a solid or liquid optical adhesive layer. The coverage area of the optical adhesive layer includes the entire liquid crystal display and can also be extend to the border frame area at the edge to ensure there is no air gap within the display surface area of the liquid crystal display module and the touch panel. This is also known as non-air-gap technology which can eliminate the optical problems of light refraction or ghosting and make the finished touch screen display product exhibit better optical characteristics and picture quality.

FIG. 1 is a structural diagram showing the conventional technology of using full lamination assembly between the touch panel and the liquid crystal display module; FIG. 2 is a cross-sectional structural diagram showing the conventional technology of using full lamination assembly between the touch panel and the liquid crystal display module; regarding conventional touchscreen 10, touch panel 12 is laminated to the display direction of the liquid crystal display module 14, the sensing area SA of touch panel 12 corresponds to the display surface DS of liquid crystal display module 14, the opaque shielding layer SH on protective glass 20 corresponds to the frame FA etc. The entire touchscreen 10 defines the sensing area SA for user operation through the opaque shielding layer SH. There is a single layer gap GP (dotted line in FIG. 2) interposed between touch panel 12 and liquid crystal display module 14. The gap GP is roughly irregular and its range spans the display surface DS and the frame FA.

Conventional full lamination technology is used to fill a gap GP sandwiched between touch panel 12 and liquid crystal display module 14 with a layer of solid optical adhesive 16, specifically to completely fill the gap GP covering the display surface DS. Some full lamination techniques avoid allowing solid-state optical adhesive 16 to overflow onto the frame FA but some full lamination techniques extend the coverage of solid optical adhesive 16 to a part of the frame FA in order to effectively eliminate most of the air layer within area of the display surface DS.

However, the aforementioned conventional full lamination using solid optical adhesive still has many shortcomings because the process is implemented in a non-vacuum environment and an additional pressurized defoaming step is added to avoid residual bubbles, resulting in increased processing time. However, even if the defoaming step is added, it is usually limited by factors such as the fluidity of the solid optical adhesive 16 itself, process temperature, and pressure conditions. It is usually difficult for solid optical adhesive 16 to completely fill positions such as turns, corners, edges, etc. at a right angle.

As shown in FIG. 2, after lamination is completed, it is difficult to avoid tiny voids 18, air bubbles, or air chambers remaining at corner positions. If these voids 18 are scattered within the range of the display surface DS, it causes the final touchscreen 10 finished product to generate defects such as light leakage, bright spots, speckling, or halos; in addition, the interior of solid optical adhesive 16 itself still inevitably contains trace gas. After touchscreen 10 is used for a period of time, under the influence of environmental factors such as thermal contraction and expansion and pressure changes, the solid optical adhesive 16 within the range of the display surface DS eventually produces bubbles, light leakage, and other defects and these various factors directly or indirectly cause poor picture quality in touch screen 10.

Therefore, there is also full lamination that uses liquid optical adhesive to fill gaps GP and its manufacturing process is roughly as follows. First, a first dam is formed at the junction of the display area and the frame area and then a second dam is formed at the frame area. Next, in a vacuum environment, the liquid optical adhesive is poured into and fills the shallow groove surrounded by the first dam and the second dam. Then the touch panel is laminated on top to prevent bubbles remaining between the liquid crystal display module and the touch panel. The laminated touch screen is cured with ultraviolet light irradiation or oven baking to stabilize its adhesion.

However, the disadvantage of the aforementioned conventional full lamination using liquid optical adhesive is that it requires the use of a vacuum cavity for liquid glue infusion and lamination and the high equipment cost. It is necessary to first form a temporary dam structure and then pour liquid glue. After pouring, it is necessary to wait for the adhesive to flow naturally and fill up and then go through the curing process. Actually the above-mentioned processes are time-consuming and the quality of the finished product is highly subject to various uncertain factors coming from, such as: the adhesive, dam-building, pouring and curing processes, etc., which renders the quality control to the product becoming harder.

Hence, there is a need to solve the above deficiencies/issues.

SUMMARY

In view of the issues in the conventional technology, the invention proposes the use of a pre-cured jelly-like gel adhesive. At first, a layer of jelly adhesive in a predetermined shape and size range is laid out on the lower surface or the lower template of a vacuum chamber. Then, secure the display module to the upper surface of the cavity, press the display module down when laminating to secure the jelly adhesive to the display area of the display module. The adhesive can overflow into the frame but not exceed the frame border. After turning over the display module after the lamination, press to affix the touch panel onto the jelly adhesive to complete the lamination of the touch screen.

This invention proposes using the characteristics of jelly adhesive which is itself between a liquid and solid state and in conditions without external disturbance, can temporarily maintain a fixed shape but requiring only a slight external disturbance to easily deform. It possesses high plastic properties and can be used to fill the irregular gap between display module and touch panel while the finished product after lamination is not prone to bubbles. The lamination process proposed by this invention does not require a subsequent defoaming step after lamination is completed nor is implement of a curing step necessary which effectively saves processing time and cost.

The present invention proposes a touch screen that is assembled by a bonding process including: a display module including a frame and a displaying area; a touch panel configured above the display module and to receive a touch input; and a gel-based optical adhesive partially pre-cured prior to an implementation of the bonding process, interposed between and bonding the display module and the touch panel, and having a coverage larger than the displaying area and less than an outer edge of the frame and a ratio of transmittance larger than a percent of 91%.

The present invention further proposes a touch screen that is assembled by a lamination process including: a display module including a corner formed at where a frame and a displaying area are joined; a touch panel configured above the display module and to receive a touch input; a high-plasticity gel-based optical adhesive cured by a pre-curing process prior to the implementation of the lamination process; and a high-plasticity curing optical adhesive required to treat with a curing process after the implementation of the lamination process, filled in and around the corner, and sandwiched between the display module and the touch panel with the high-plasticity gel-based optical adhesive to render the display module and the touch panel bonded.

The present invention further proposes a touch screen that is assembled by a bonding process including: a display module including a corner formed at where a metal-made bezel and a displaying area are converged; a touch panel configured above the display module and to receive a touch input; a first gel-based optical adhesive partially cured in advance by a curing process prior to the implementation of the bonding process; and a second gel-based optical adhesive partially cured in advance by a curing process prior to the implementation of the bonding process, filled in and around the corner, and configured between the display module and the touch panel with the first gel-based optical adhesive to render the display module and the touch panel bonded.

DESCRIPTION OF THE DRAWINGS

A more complete appreciation of the invention and many of the attendant advantages thereof are readily obtained as the same become better understood by reference to the following detailed description when considered in connection with the accompanying drawing, wherein:

FIGS. 23-24 are illustrative examples of physical properties table for the gel-based optical adhesive in accordance with the present invention.

DETAILED DESCRIPTION

Figure 1:
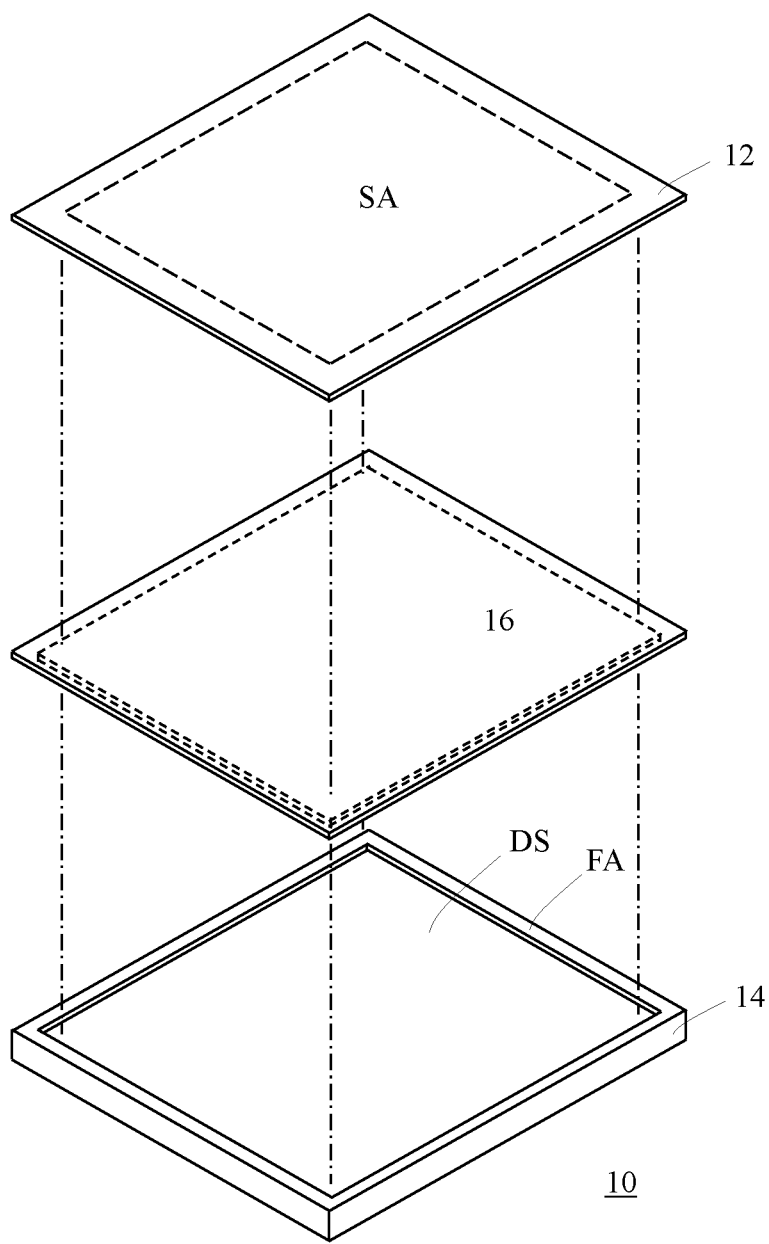
FIG. 1 is a structural diagram showing the conventional technology of using full lamination assembly between the touch panel and the liquid crystal display module.
Figure 2:
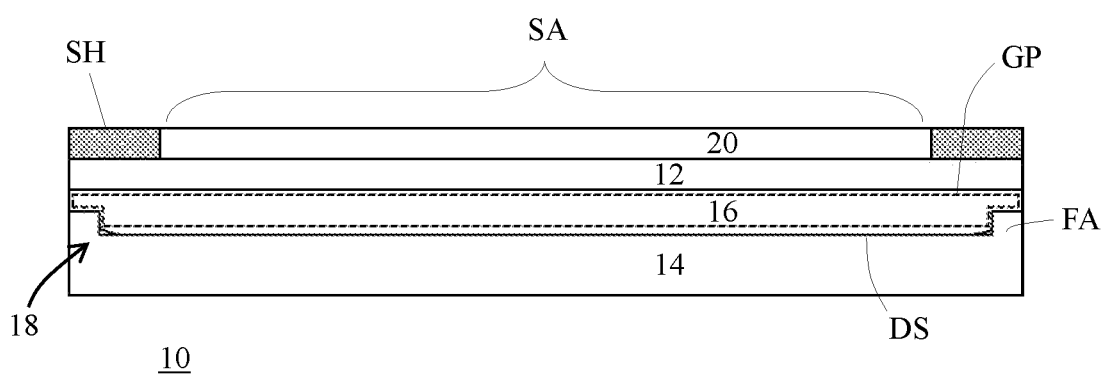
FIG. 2 is a cross-sectional structural diagram showing the conventional technology of using full lamination assembly between the touch panel and the liquid crystal display module.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

The gel optical adhesive proposed by this invention, prior to the start of the lamination process, the liquid optical adhesive undergoes partial curing, a partially or fully pre-cured treatment before the start of the lamination process starts, so that it transforms into a gel state physical properties between a liquid and solid state and possesses a lower fluidity or a higher viscosity. Absent the condition of external disturbance, viscosity is enough to maintain a fixed external shape without any deformation due to arbitrary flow.

The pre-cured gel optical adhesive has a colorless and translucent appearance, looks jelly-like but has high-plasticity and elasticity. It is neither solid nor liquid which can eliminate the shortcomings of liquid optical adhesive or solid optical adhesive in the full lamination process.

The gel optical adhesive of this invention that has been cured to a gel state does not flow arbitrarily and fail to maintain a shape like optical adhesive in a liquid state which may increase the difficulty and complexity of the implementation of the overall process, nor is it difficult for it to flow and fill gaps like solid optical adhesive, resulting in optical defects such as light leakage, bright spots or speckling in the end product.

The gel optical adhesive of this invention tested under the JIS K 2207 testing method received a level 5 for cone penetration. After being applied to the surface to be bonded and adhesion is completed, waiting for 15 minutes to 30 minutes 1, and heating at a temperature between 50° C. and 65° C., the predetermined adhesive strength can be quickly reached. After the adhesion is completed, the gel optical adhesive layer provides adhesion strength of 3.0N~10N (Newton/20 mm) per 20 mm length according to different materials to be adhered.

FIGS. 23-24 are illustrative examples of physical properties table for the gel-based optical adhesive in accordance with the present invention. In terms of optical properties, after adhesion is completed, the gel optical adhesive has a high light transmittance of greater than 91% and a low light refractive index of less than 1.41 in the visible wavelength range. In terms of electrical properties, the gel optical adhesive has good dielectric properties after adhesion, has a volume resistance of at least $8\times10^{15}$ Ω·cm, a surface resistance of at least $3\times10^{15}$ Ω·cm, and a dielectric constant of between 2.79~2.81, providing a good dielectric layer. After measurements, the gel-based optical adhesive in accordance with the present invention has the physical properties as listed in table shown in FIGS. 23 to 24.

FIGS. 3 to 6 are structural diagrams showing of the touch screen at various stages during the bonding process in accordance with the first embodiment of the present invention; in the first embodiment, a gel-based optical clear adhesive is used to replace liquid optical adhesive or solid optical adhesive as an optical gel adhesive layer and is filled in the inter-layer gap between the touch panel and the display module. The touch panel is preferably a resistive-type touch panel, a capacitive-type touch panel, an infrared-ray based touch panel or an electromagnetic-type touch panel, and the display module is preferably a plasma display panel (PDP), a liquid crystal display (LCD), a thin film transistor liquid crystal display (TFT-LCD), a light-emitting diode display (LED), an organic light-emitting diode display (OLED) or organic electroluminescence display (OELD).

Figure 3:
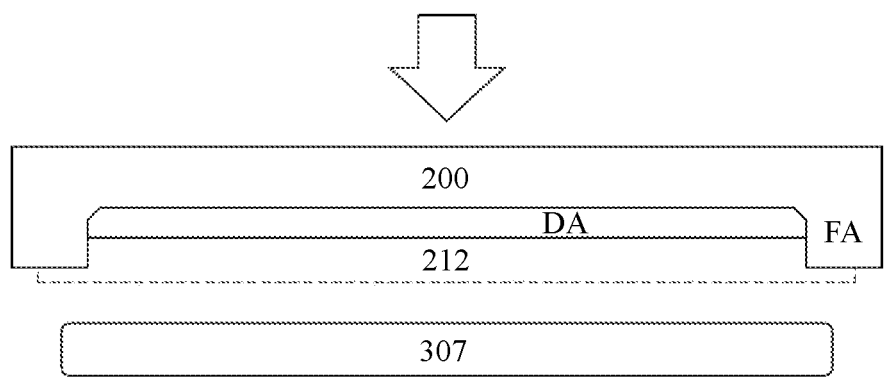
FIGS. 3 to 6 are structural diagrams showing of the touch screen at various stages during the bonding process in accordance with the first embodiment of the present invention.

As demostrated in FIG. 3, first lay a layer of gel optical adhesive 307 on the lower template in the vacuum laminating machine chamber, then place finished product of the display module 200 higher than gel optical adhesive 307, move the display module 200 into the vacuum laminating machine chamber with the display area DA of the display facing downward and facing the gel optical adhesive 307, and secure it on a movable template. The position of the movable template is preferably lower than the upper template and higher than the lower template. The frame FA, the display area DA, and the height difference between the frame FA and the display area DA on the display module 200 together form a virtual rectangular groove 212 on the display module 200 used for the subsequent filling of gel optical adhesive 307. The gel optical adhesive 307 laid on the lower template has a shape corresponding to the shape of the display module 200 and its size should preferably be larger than the range of the display area DA and falls onto the frame FA but does not exceed the outermost edge of the frame FA.

Figure 4:
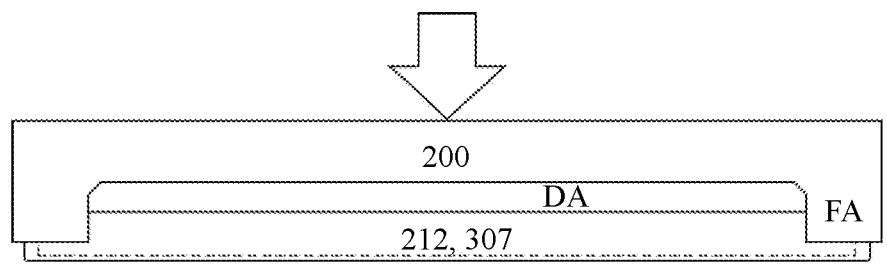

As demostrated in FIG. 4, after the gel optical glue 307 is laid on the lower template and the display module 200 is secured on the movable template, the chamber is evacuated and by for example: the movable template is lowered, pressing the display module 200 onto gel optical adhesive 307, and continuing to squeeze gel optical adhesive 307 into the rectangular shallow groove 212 of the display module 200 until gel optical adhesive 307 is fills or exceeds the space of entire virtual rectangular shallow groove 212.

Figure 5:
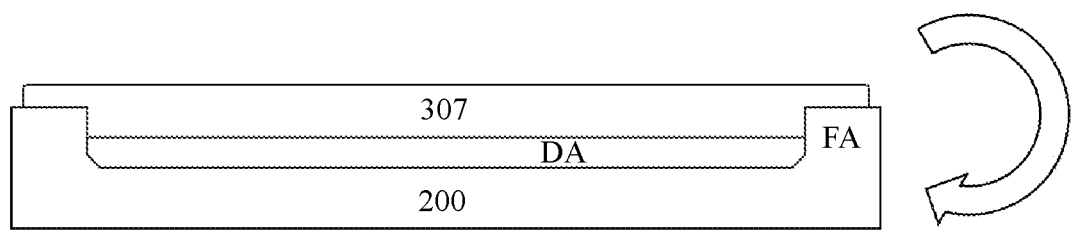

As demostrated in FIG. 5, the display module 200 including gel optical adhesive 307 is raised to an appropriate height by, for example, raising the active template and then rotating the active template to perform a horizontal flip of 180° making the display area DA of the display module 200 and the gel optical adhesive 307 filled it flip to face upward.

Figure 6:
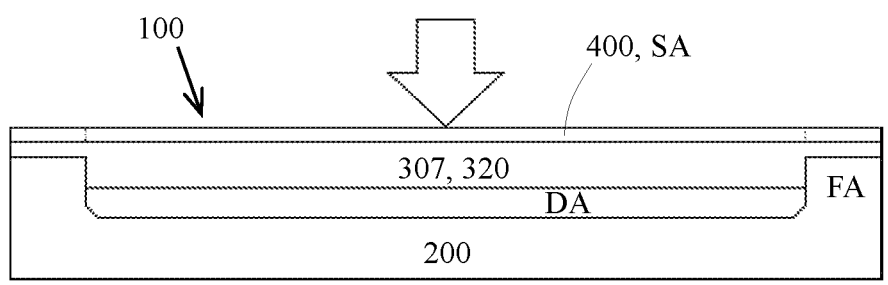

Next, as demostrated in FIG. 6, in a vacuum environment, touch panel 400 that has been secured on the upper template in advance is pressed down and bonded to the gel from above by, for example, lowering the upper template onto gel optical adhesive 307 and laminating touch panel 400 to the display module 200, or by, for example, directly lifting the active template, allowing the display module 200 to be lifted up and laminated to touch panel 400 on the upper template. The position of the sensing area SA of touch panel 400 is aligned with the display area of the display module 200, so that the display module 200 and touch panel 400 are jointly assembled into touch screen 100. Due to the entire operation of the lamination process occurring in a vacuum environment and there being no bubbles inside gel optical glue 307 itself, no bubbles will remain between the display module 200 and touch panel 400 after lamination is completed.

Next, after lamination, touch screen 100 is heated from room temperature to a temperature between 50° C. and 65° C. which is maintained for approximately 15 minutes to 30 minutes. Inside touch panel 400, the internal structure of gel optical adhesive 307 between touch panel 400 and the display module 200 is damaged a second time due to temperature rise. A part of gel optical adhesive 307, such as the outer layer gel optical adhesive 307, liquefies temporarily due to a decrease in cohesion and begins to fill up every uneven corner or every irregularly shaped seam or gap, increasing the contact area and adhesion area between gel optical adhesive 307 and touch panel 400 and the display module 200.

When heating is completed, after gel optical adhesive 307 of this invention undergoes a period of cooling, resolidification, hardening or bonding at room temperature, no bubbles will remain, there will be no defects such as air gaps, light leakage, bright spots, or halos or bonding. The final predetermined adhesive strength is relatively higher than that of conventional liquid optical adhesive, solid optical adhesive, or conventional optical adhesive and it can provide better optical characteristics than conventional liquid optical adhesive, solid optical adhesive, or conventional optical adhesive. The optical properties of the gel optical adhesive described in this embodiment are preferably, but not limited to, silicone or silicon dioxide ($SiO_2$).

Since gel optical adhesive 307 has been pre-cured, an additional curing machine or the performance of a curing step is not necessary for touch screen 100 after lamination, and touch screen 100 proposed by this invention, because the entire laminating process is implemented in a vacuum environment, touch screen 100 does not need to undergo another defoaming step after lamination which can save processing time and cost.

In summary, in this embodiment, the cured gel optical glue 307 is filled in between the display module 200 and touch panel 400, bonding the display module 200 and touch control panel 400 and forming a layer of translucent gel optical adhesive lamination layer 320. Since gel optical adhesive 307 is in a gel state between a liquid and a solid, it will not flow like a liquid optical adhesive and be formless. It is also unlike solid optical adhesives, which flow with difficulty. Thus, the overall process is relatively easy to implement.

Furthermore, since gel optical adhesive 307 can fully fill corners, irregular seams, assembly seams, or voids after being heated during the lamination process and subsequent heating step, there will be no air bubbles remaining and no air gap in the translucent gel optical adhesive lamination layer 320 between the display module 200 and touch panel 400. Thus, it will not cause optical defects such as light leakage, bright spots, or halos. After lamination, since a layer of translucent gel optical adhesive 320 is uniformly filled between the display module 200 and touch panel 400, overall light transmittance is greatly improved and effectively enhances the display quality of touch screen 100. The overall process above does not need to implement a curing step nor does it need to implement a defoaming step, greatly reducing manufacturing time and manufacturing cost.

The second embodiment of this invention uses two types of optical adhesives as the optical adhesive lamination layer with similar primary components but different physical properties to perform lamination of the touch screen. The first optical adhesive is the pre-cured gel optical adhesive in a gel state disclosed in the first embodiment or high-plasticity gel optical adhesive.

The second type of optical adhesive is a high-plasticity curing optical adhesive which is based on the main component of the first optical adhesive, or having silicone polymer as the main component but further adding components such as room temperature curing adhesive, ultraviolet (UV) curing adhesive, thermosetting adhesive or compound adhesive. However, the second optical adhesive does not receive curing treatment in advance before the lamination process begins and its appearance is colorless, transparent or translucent but, after composition adjustment, has higher plasticity and elasticity than the first optical adhesive or has higher fluidity and lower viscosity than the first optical adhesive. The physical properties and optical properties of the second optical adhesive are roughly similar to the first optical adhesive and it falls within the range listed in table as shown in FIGS. 23-24 but it is easier for the first type of optical adhesive to flow after external disturbance.

Figure 7:
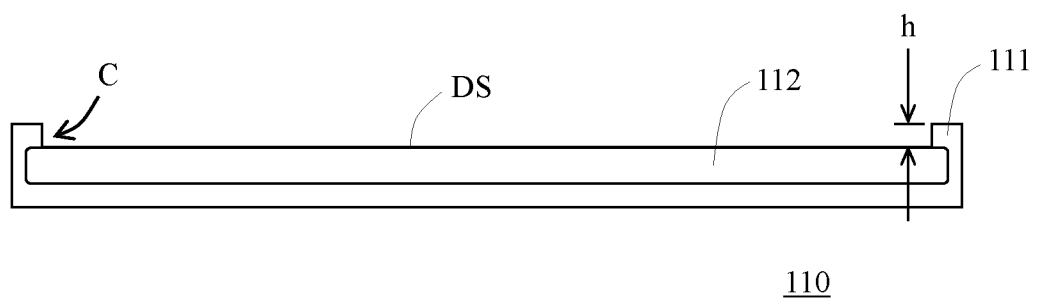
FIG. 7 is a cross-sectional structural diagram showing the structure of the display module used in the present invention.

FIG. 7 is a cross-sectional structural diagram showing the structure of the display module used in the present invention; as shown in FIG. 7, a display module 110 is first provided. The display module 110 preferably includes a metal frame 111 that surrounds the display 112 that includes a rectangular display surface DS. The metal frame 111 is located at the peripheral edge of the display module 110. There is a considerable height difference h between metal frame 111 and display 112 or the display surface DS. The height difference h and corner C formed by the height difference h are items that are difficult to handle in the lamination process. Part of the reason is described in Section B of the prior art, with the process limited by factors such as low fluidity of the optical adhesive itself, process temperature, and pressure. Such conditions make it difficult for the optical adhesive to fill locations such as corners with height difference h, corners C, border areas completely at right angles. These are also the locations where micro-voids, bubbles, or air cells are most likely to remain after lamination.

Another part of the reason is that the display module 110 is composed of a metal frame 111 covering display 112, so at the intersection of metal frame 111 and display 11, there will be micro gaps such as small assembly seams, screw holes, or structural seams in the structure. Thus, there will be relatively more irregularities or irregularly shaped seams or voids in corner C. If the fluidity of the optical adhesive is insufficient, it is not easy to completely fill these irregularities or irregularly shaped seams or gaps.

Therefore, this invention proposes that it is better to use the second type high-plasticity curing optical adhesive 122 which possesses a relatively high fluidity to fill corner C. Since high-plasticity curing optical adhesive 122 has not yet cured, it is more fluid compared with the first type high-plasticity condensed optical adhesive and it is easier to fill corner C and its surroundings at a right angle while further filling in the micro gaps in corner C. Not only can residual tiny voids, bubbles, or air cells, be avoided in corner C but defects such as light leakage, bright spots, or halos can also be eliminated in the finished product. Physical air tightness and moisture resistance of the finished product can also be enhanced. The overall adhesive area is increased to improve adhesive strength and enhance the structural strength of the finished product.

Figure 8:
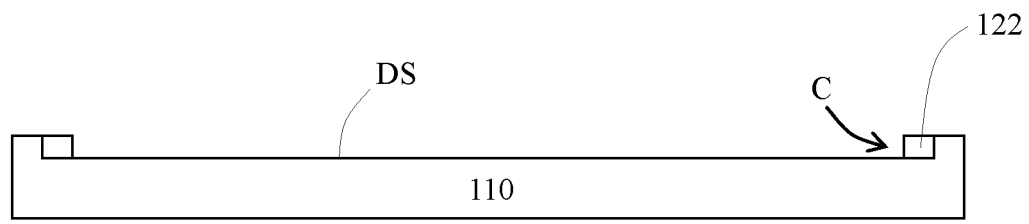
FIGS. 8 to 11 are structural diagrams showing the touch screen at various stages during the lamination assembly process in accordance with the second embodiment of the present invention.

FIGS. 8 to 11 are structural diagrams showing the touch screen at various stages during the lamination assembly process in accordance with the second embodiment of the present invention; then, as shown in FIG. 8, high-plasticity curing optical adhesive 122 filling the corners C of the display module 110. The applied high-plasticity curing optical adhesive 122 forms a box shape along with the shape of the corners C and then according to the different components contained in high-plasticity curing optical adhesive 122, for example: room temperature curing adhesive, UV curing adhesive or thermal curing glue. In terms of curing high-plasticity curing optical adhesive 122 on the display module 110, if necessary, move the display module 110 together with high plastic curing optical glue 122 into the UV curing machine or high temperature curing machine for curing.

Figure 9:
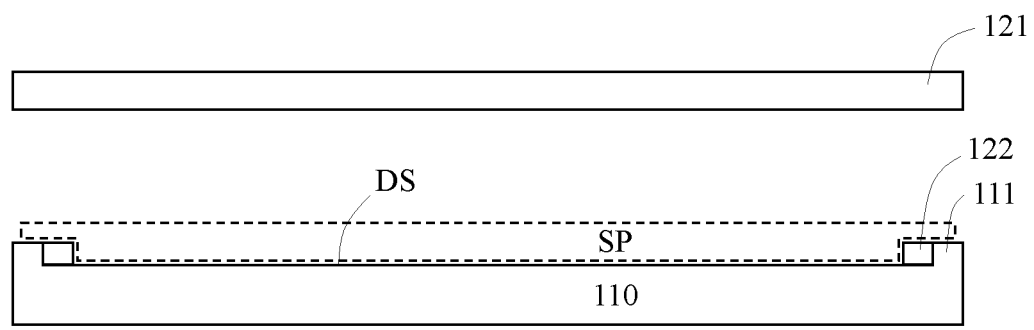

Next, as shown in FIG. 9, a layer of high-plasticity condensed optical adhesive 121 is prepared. For example, the above process can be implemented in the following manner. A layer of high-plasticity condensed optical adhesive 121 is laid flat on the lower template in the vacuum laminating machine chamber; the shape and size of high-plasticity condensed optical adhesive 121 preferably corresponds to the shape of the display module 110. Its size preferably overlaps onto metal frame 111 but does not exceed the outermost edge of metal frame 111 or the shape, size, and thickness of high-plasticity condensed optical glue 121 should correspond to and at least be sufficient to fill the shallow groove space (shallow recession part) SP on the display module 110.

Figure 10:
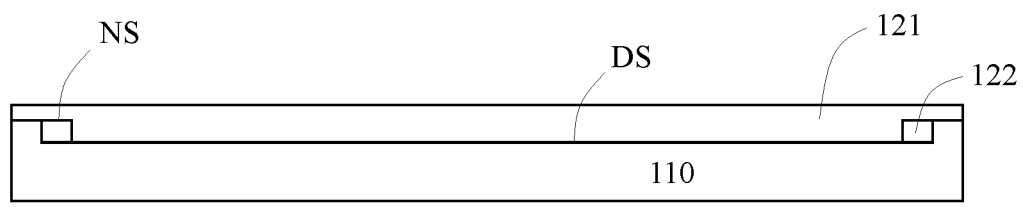

Next, as shown in FIG. 10, the display module 110 together with cured high-plasticity curing optical adhesive 122 is pressed into high-plasticity condensed optical adhesive 121 until high-plasticity condensed optical adhesive 121 either is fills or overflows shallow groove space SP. For example, the above process can be implemented in the following way, the display module 110 and cured high-plasticity curing optical adhesive 122 can be at a higher level than high-plasticity condensed optical adhesive 121 and the display surface DS is face down towards high-plasticity condensed optical adhesive 121 laid out on the lower template. The display module 110 secured to a movable template in the vacuum laminating machine chamber and then the chamber is evacuated and the movable template is continuously lowered. The display module 110 is pressed down onto the high-plasticity condensed optical adhesive 121, so that the high-plasticity condensed optical adhesive 121 is pushed into the shallow groove space SP of the display module 110 until high-plasticity condensed optical adhesive 121 either fills or overflows the entire shallow groove space SP.

Figure 11:
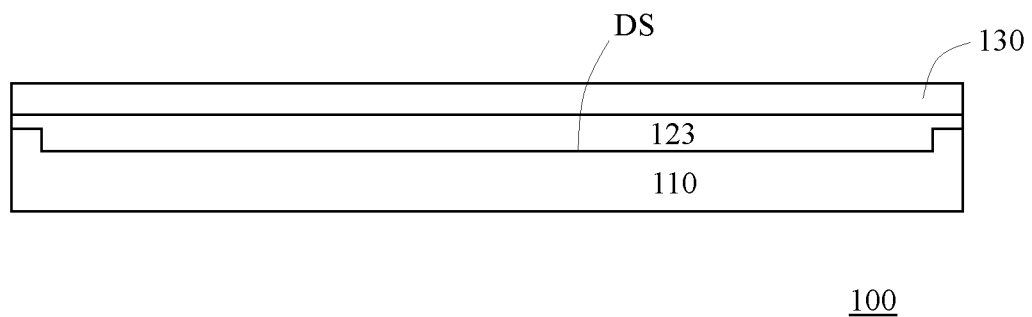

Next, as demostrated in FIG. 11, after aligning another touch panel 130 with the display module 110 while maintaining a vacuum environment, move touch panel 130 or the display module 110 to laminate touch panel 130 and the display module 110 together using high-plasticity condensed optical glue 121 to form the final finished product touch screen 100.

This embodiment uses a second optical adhesive that has not been pre-cured which has better fluidity and lower viscosity than the first optical adhesive that has been pre-cured before the bonding process starts but can maintain a certain shape which is good for filling and dealing with corners and uneven surfaces. Therefore, the second type of optical adhesive is dedicated to filling the surrounding borders and corners of the display module. The first type of optical adhesive fills the remaining space, mainly the central display area. Since the two types of optical adhesive have approximately the same main components, when the finished touch screen undergoes second-stage heating or later-stage curing processes, the interface NS between the two types of optical adhesives demostrated in FIG. 10 will disappear and the two types of optical adhesives merge into a single optical adhesive layer 123.

The third embodiment of the present invention uses two types of gel optical adhesives with different or the same hardness and conductivity as the optical adhesive adhesion layer and performs lamination of the touch screen. Before beginning the first type of lamination, curing has been performed in advance. After composition adjustment, the gel state gel optical adhesive has relatively harder properties than the second gel optical adhesive but does not flow with difficulty like a solid optical adhesive which may increase the difficulty and complexity of the overall process.

Before the beginning of the second type of lamination, the curing process has been performed in advance. After composition adjustment, the gel state gel optical adhesive that is relatively softer than that of the first gel optical adhesive is more suitable for filling in the corners, turns, borders, or height differences in the touch screen. The gel state gel optical adhesive enters gaps and irregular assembly seams more easily and demonstrates better adhesive properties but at the same time it either does not flow arbitrarily or is unable to stay still in a shape, like the liquid optical adhesive.

The first type of gel optical adhesive is preferably used as the main optical adhesive lamination layer which is primarily filled into the range of the display area. The second type of gel optical adhesive has softer properties after adjustment, is more fluid than the first type of harder gel optical adhesive, and can better flow into assembly seams, screw holes, structural joints, and uneven, irregular, or complex surfaces. It is designed to be filled into the intersection of metal frame 111 and display 112 and its surrounding structure and as a solution for the small assembly seams, screw holes, structural joints, and uneven, irregular, or complex surfaces distributed around the border.

Both the first gel optical adhesive and the second gel optical adhesive have been previously cured before the bonding process and their physical properties and optical properties are roughly similar to the gel optical adhesive as a substrate and fall within the scope listed in table as shown in FIGS. 23-24.

The first type of gel optical adhesive is based on the second type of gel optical adhesive, gel optical adhesive or high-plasticity solid adhesive and other components, further selectively adding, mixing or doping, such as but not limited to: conductive polymers and other components, the appearance of which is preferably colorless, light-transmitting, or transparent. The second gel optical adhesive is based on the first gel optical adhesive, gel optical adhesive or high-plasticity solid adhesive and other components, further selective adding, mixing, or doping components such as, but not limited to, conductive polymers, high-energy ultraviolet light hardeners, graphene, etc., the appearance of which is preferably colorless, light-transmitting, transparent, or black.

In the third embodiment, through the joint use of the first gel optical adhesive and the second gel optical adhesive for lamination, not only can residual tiny voids, air bubbles or air cells, etc. in corners be avoided, optical defects such as light leakage, bright spots, or halos that may occur in the finished product can also be eliminated. The physical air tightness and moisture resistance of the finished product can also be enhanced and increasing the overall adhesive area to raises adhesive strength and enhances the structural strength of the finished product.

Figure 12:
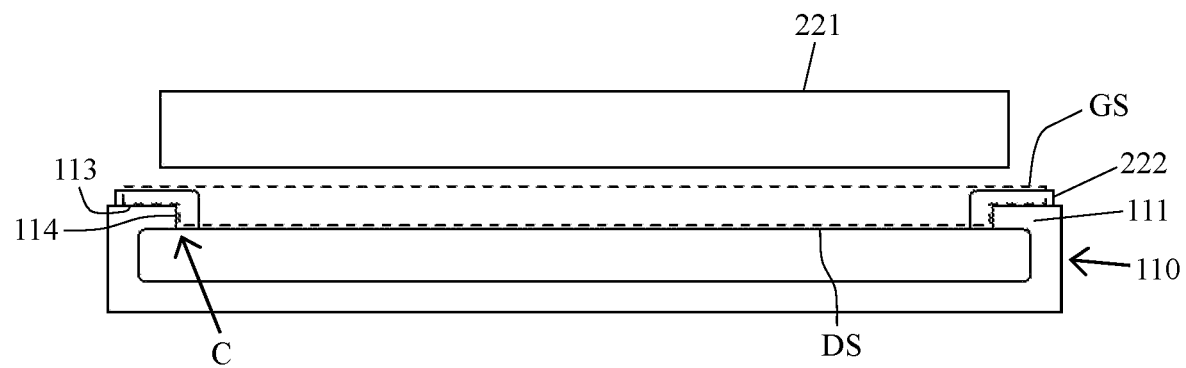
FIGS. 12 to 15 are structural diagrams showing the touch screen at various stages during the bonding assembly process in accordance with the third embodiment of this invention.
Figure 13:
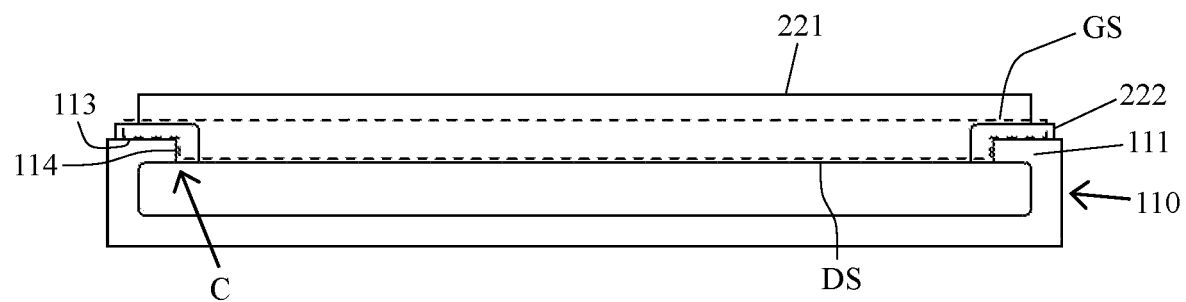

FIGS. 12 to 15 are structural diagrams showing the touch screen at various stages during the bonding assembly process in accordance with the third embodiment of this invention; in the third embodiment of this invention, as demostrated in FIG. 12, upper surface 113 of a part of metal frame 111 of the display module 110 is provided with softer second gel optical adhesive 222 and the filled in second gel optical adhesive 222 follows metal frame 111 forming the shape of a square. It will cover side wall 114 of metal frame 111 and a part of corner C. A hard layer is prepared separately and will fill most of the gap GS between the display module 110 and touch panel 130. The layer of the first gel optical adhesive 221 is the main optical adhesive lamination layer. The first gel optical adhesive 221 preferably corresponds approximately in position to the display surface DS and can cover most of the display surface, as disclosed in FIG. 13.

Figure 14:
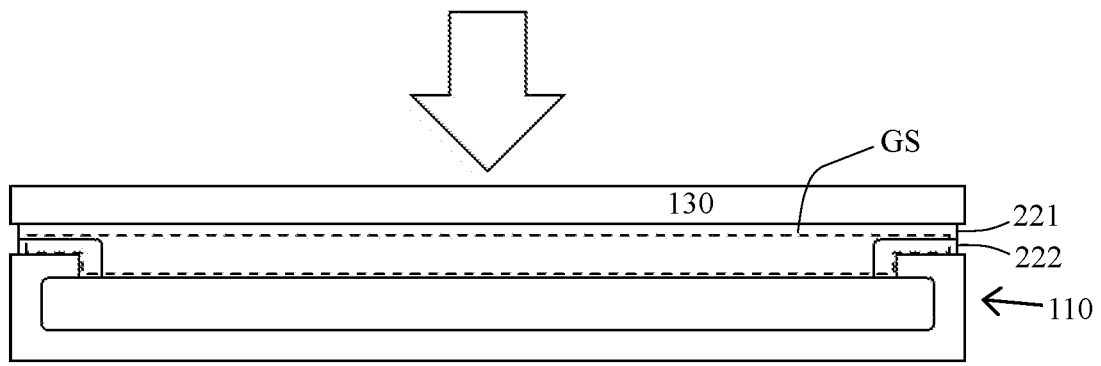
Figure 15:
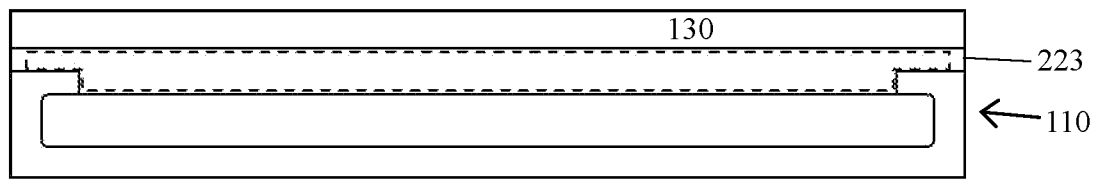

Next, as demostrated in FIGS. 14 and 15, after aligning another touch panel 130 with the display module 110 in a vacuum environment, touch panel 130 or the display module 110 is moved so that touch panel 130 and the display module 110 are bonded together through the first gel optical adhesive 221 to form final finished product touch screen 100; during the downwards pressing process of touch panel 130, due to second gel optical adhesive 222 being softer than the first gel optical adhesive 221, when the softer second gel optical adhesive 222 which fills and corresponds to corner C and the peripheral of corner C is compressed, it is more easily pressed into the assembly seam, screw holes, structural joints, and uneven, irregular, or complex surfaces. By exerting adhesive strength, it can prevent residual tiny voids, bubbles, or air cells in corner C, increase the physical air tightness and moisture resistance of the finished product, and increase the overall adhesion area to improve adhesion strength and enhance the structural strength of the finished product.

It is worth noting that the second gel optical adhesive 222 filled into the display area can also preferably incorporate high-energy ultraviolet light hardener components. After the lamination process is implemented, touch screen 100 and the second gel optical adhesive 222 included in touch screen 100 is subjected to an ultraviolet curing process. When the hardening process is completed, the hardness of the second gel optical adhesive 222 is higher than that of the first gel optical adhesive 221. The display module 110 is more tightly bonded and, due to the increased hardness, it is not easy to deform when compressed which can solve the problem of the gel generating voids at the edge of the frame after being restored from compression and deformation.

Next, post lamination touch screen 100 is selectively heated from room temperature to a temperature between 50° C. and 65° C. and maintained for a period of approximately 15 to 30 minutes. In this type of later second heating step, the first gel optical adhesive 221 and the second gel optical adhesive 222 temporarily melt into a liquid state due to temperature rise and the first gel optical adhesive 221 and the second gel optical adhesive 222 will flow naturally again to conform to the shape of the micro-slits, fill and penetrate each micro-slit again, and make the junction originally existing between the first gel optical adhesive 221 and the second gel optical adhesive 222 disappear. With approximately the same main component, the first gel optical adhesive 221 and the second gel optical adhesive 222 are melted and mixed again to form a layer of gel optical adhesive 223, as shown in FIG. 15.

Figure 16:
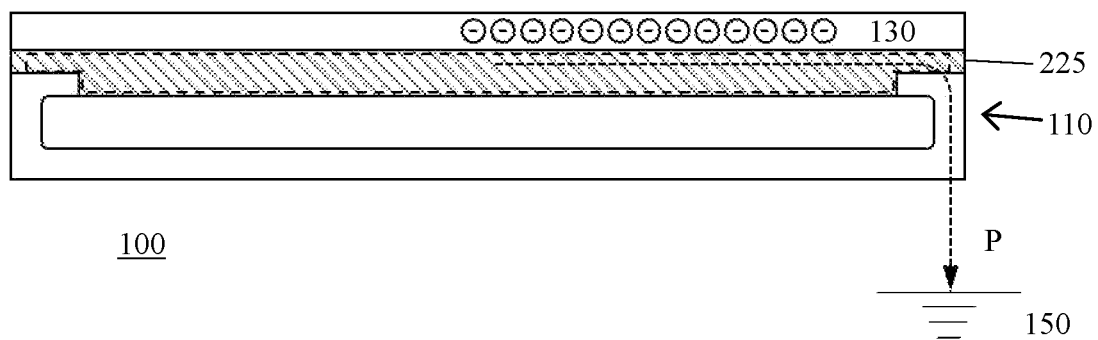
FIG. 16 is a structural diagram showing the touch screen in accordance with the fourth embodiment of the present invention.

FIG. 16 is a structural diagram showing the touch screen in accordance with the fourth embodiment of the present invention; on the basis of the third embodiment, the first gel optical adhesive 221 may preferably further incorporate a conductive polymer material component. The two-gel optical adhesive 222 may also be blended with a conductive graphene material component and appear black to define the range of metal frame 111. With approximately the same main component, when the conductive first gel optical adhesive 221 and the second gel optical adhesive 222 are melted and mixed again to form a conductive gel optical adhesive layer 225, the entire layer of conductive gel optical adhesive layer 225 can provide protective efficacy against electromagnetic interference (EMI) for the display module 110.

As shown in FIG. 16, when conductive gel optical adhesive layer 225 is in contact with metal frame 111 and constitutes electrical conduction, once metal frame 111 is connected to ground 150, the entire piece of conductive gel optical adhesive layer 225 can be used as an EMI protection layer and the accumulated charge on touch screen 100 can be conducted out from touch screen 100 through conductive path P composed of conductive gel optical adhesive layer 225, metal frame 111, and ground terminal 150 and achieve the effect of EMI protection; conductive gel optical adhesive layer 225 of this invention can also serve as an EMI protection layer while bonding touch panel 130 and the display module 110.

Figure 17:
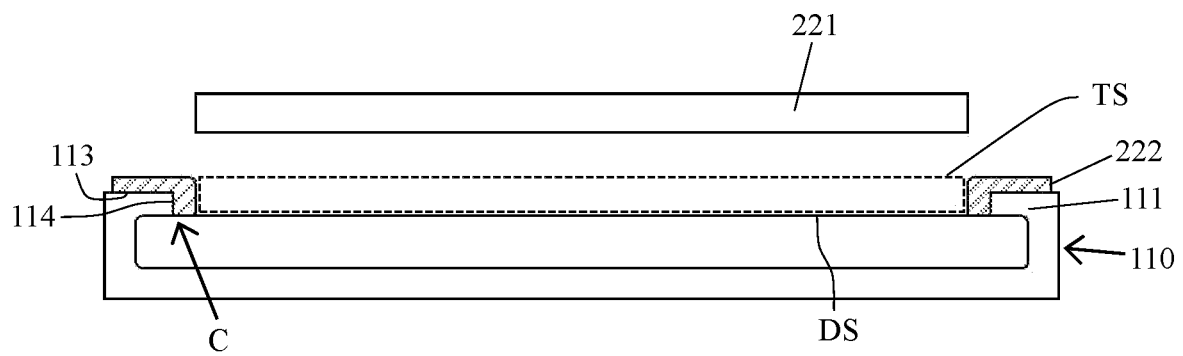
FIGS. 17 to 22 are structural diagrams showing the touch panel at various stages during the assembly process in accordance with the fifth embodiment of this invention.

FIGS. 17 to 22 are structural diagrams showing the touch panel at various stages during the assembly process in accordance with the fifth embodiment of this invention. In the fifth embodiment of this invention, as shown in FIG. 17, first, on metal frame 111 of the display module 110 and the structure around metal frame 111, an additional layer of conductive second gel optical adhesive 222 is provided, the filled second gel optical adhesive 222 follows the shape of metal frame 111 forming a square shape, and covers a part or all of upper surface 113 of metal frame 111, part or all of side wall 114, part or all of corner C, and a small part of display surface DS. The second gel optical adhesive 222 and display surface DS forms a rectangular shallow groove space (shallow recession part) TS.

In addition, a layer of first gel optical adhesive 221 is provided, preferably a conductive gel optical adhesive mixed with a conductive material or a dielectric gel optical adhesive. In this embodiment, the first gel optical adhesive 221 is a dielectric gel optical adhesive and its size and shape preferably corresponds to the shallow groove space TS between the display module 110 and touch panel 130 and is filled into the shallow groove space TS as an optical adhesive bonding layer that covers most of the display surface DS. After the first gel optical adhesive 221 is filled into the shallow groove space TS, it forms optical adhesive surface 224 together with the second gel optical adhesive 222, as shown in FIG. 18.

In this embodiment, the second gel optical adhesive 222 is preferably based on the first gel optical adhesive 221 or a high-plasticity solid adhesive but further selectively adding, mixing, or doping, such as but not limited to: conductive polymer, graphene, etc., to make the second gel optical adhesive 222 conductive. Since the second gel optical adhesive 222 will eventually be blocked by another decorative shielding layer and will not be exposed on the touch screen, the appearance of the second gel optical adhesive 222 can be adjusted from light-transmitting, transparent, and colorless to black. Optionally, the second gel optical adhesive 222 can be adjusted to be softer than the first gel optical adhesive 221; optionally, a high-energy ultraviolet light hardener can be added to the second gel optical adhesive 222.

Figure 18:
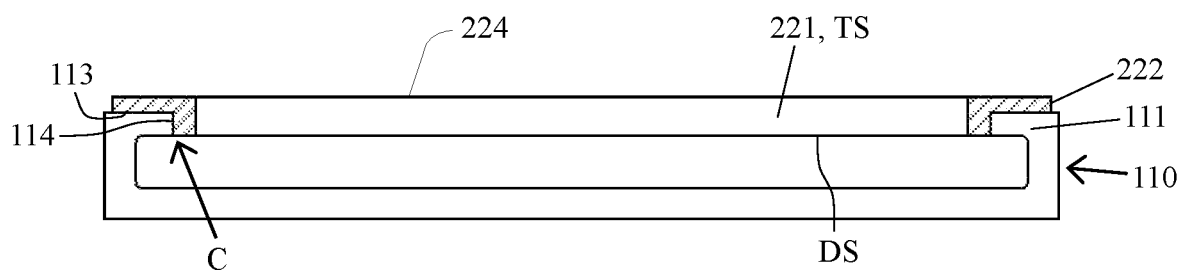

The steps demostrated in FIG. 17 and FIG. 18 can be implemented in but not limited to the following ways for example, placing the display module 110 on the lower template in the vacuum lamination machine chamber in a vacuum environment, directly laying the second gel optical adhesive 222 corresponding to the shape of metal frame 111 onto upper surface 113 of metal frame 111 of the display module 110, side wall 114 of metal frame 111, and corner C. Then the dielectric first gel optical adhesive 221 which is sufficient to fill shallow groove space TS is directly laid into shallow groove space TS. Shallow groove space TS is roughly a rectangular space enclosed by display surface DS and conductive second gel optical adhesive 222. The first gel optical adhesive 221 can substantially cover a part of display surface DS in its position. After the first gel optical adhesive 221 is filled into shallow groove space TS, the second gel optical adhesive 222 forms optical adhesive surface 224 after leveling.

Figure 19:
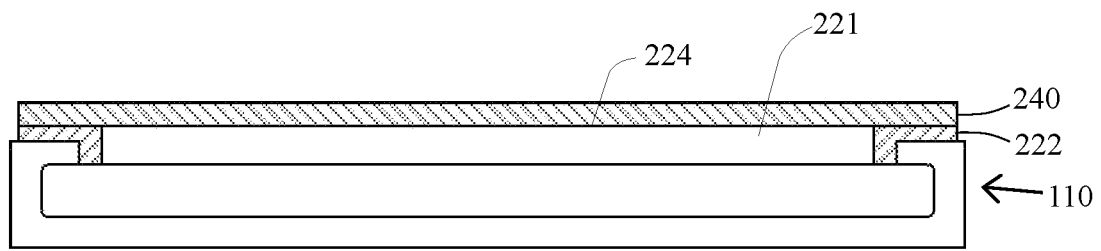
Figure 20:
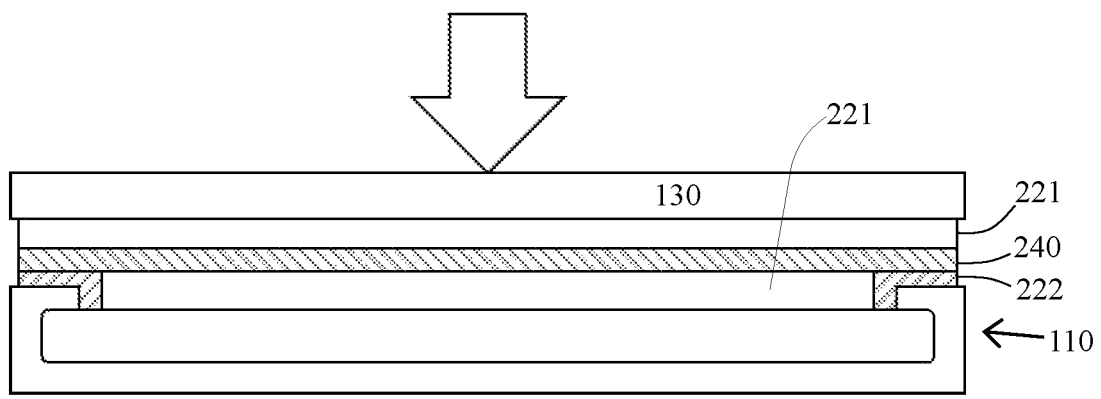

Next, as shown in FIG. 19, on optical adhesive surface 224 formed by conductive layer 240, and then as shown in FIG. 20, above conductive layer 240 continue to fill in a second layer of dielectric first gel optical adhesive 221. Then laminate touch panel 130 to the second layer of the first gel optical adhesive 221 and the assembly and production of touch screen 100 are completed after proper pressing and bonding. The completed touch screen 100, containing conductive layer 240, will be connected to metal frame 111 which is made of metal through the conductive second gel optical adhesive 222. When metal frame 111 is properly electrically connected to ground terminal 150, it can be used as an EMI protection layer. Charge accumulated on touch screen 100 is conducted out of touch screen 100 through conductive path P composed of conductive layer 240, the second gel optical adhesive 222, metal frame 111, and ground terminal 150, to achieve EMI protection, as demostrated in FIG. 21.

Figure 21:
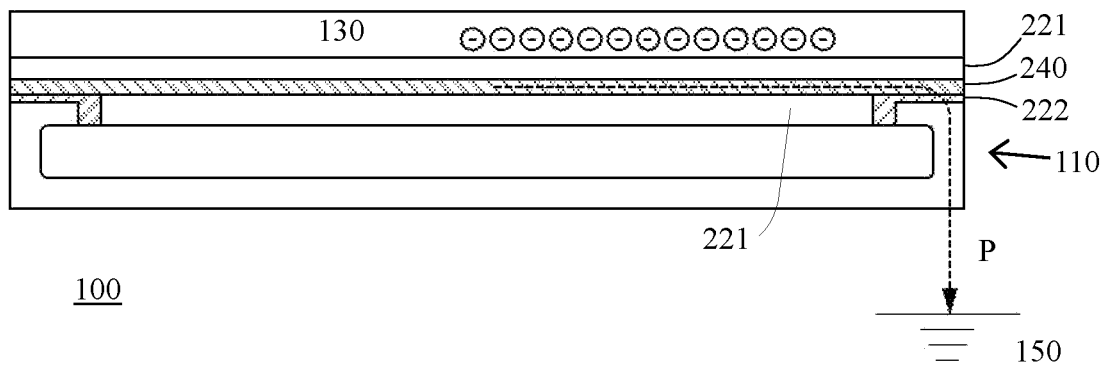
Figure 22:
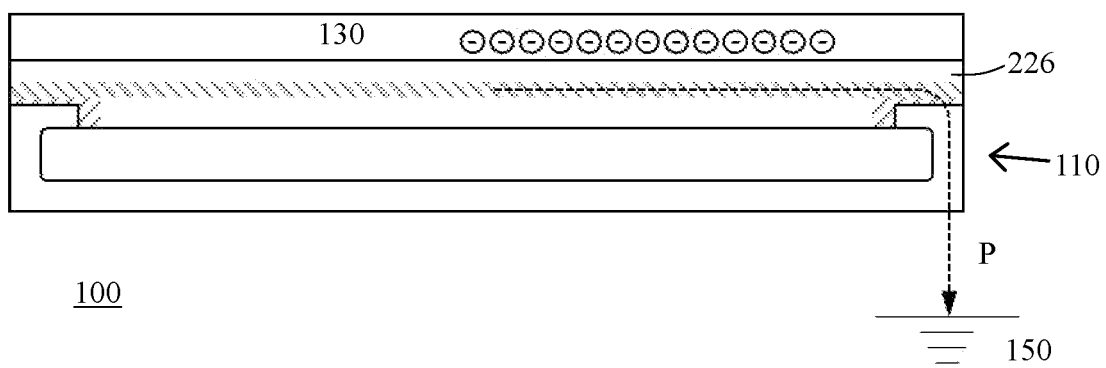

The steps demostrated in FIG. 19 to FIG. 21 can be implemented by, for example, but not limited to the following methods. First, temporarily remove the display module 110, including the first gel optical adhesive 221 and the second gel optical adhesive 222, from the vacuum laminating machine. Then conductive layer 240 can be preferably manufactured in the following ways and formed on the surface of optical adhesive 224; optionally, mix light-transmitting conductive polymer or a light-transmitting graphene material into the first gel optical adhesive 221 or the second gel optical adhesive 222 and then a layer of the first gel optical glue 221 or the second gel optical adhesive 222 containing the light-transmitting conductive polymer or the light-transmitting graphene material is deposited on surface 224 of the optical adhesive as conductive layer 240; or optionally, by inkjet printing, coating, or dipping, etc. a conductive coating containing a conductive polymer or graphene material is formed on optical adhesive surface 224 as conductive layer 240, as demostrated in FIG. 19.

Then, the display module 110 including conductive layer 240 is moved back to the vacuum laminating machine and a second layer of first gel optical adhesive 221 is spread on conductive layer 240. Additionally, installed touch panel 130 on the upper template. After corresponding conductive layer 240 to the display module 110 below, maintaining a vacuum environment, choose to move touch panel 130 on the upper template or the display module 110 on the lower template to laminate touch screen 130 onto the second layer of the first gel optical glue 221, as demostrated in FIG. 20.

Next, an appropriate downward pressure is applied to touch panel 130, so that the first gel optical adhesive 221 and the second gel optical adhesive 222 are pressed to fill the edge of metal frame 111, as shown in FIG. 21. If the second gel optical adhesive 222 has been selectively adjusted to be softer than the first gel optical adhesive 221, during the pressing process, when the softer second gel optical adhesive 222 corresponding to corner C and the surroundings of corner C is under pressure, it will be more easily pressed into assembly seams, screw holes, structural joints, and uneven, irregular, or complex surfaces. Exerting adhesive force, it can prevent minute voids, bubbles, or air cells in corner C. It can increase the physical air tightness and moisture resistance of the finished product and increase the overall adhesion area to improve adhesion strength and enhance the structural strength of the finished product.

Next, after lamination, touch screen 100 is selectively heated from room temperature to a temperature between 50° C. and 65° C. and maintained for a period of approximately 15 to 30 minutes. In this type of later stage second heating step, the first gel optical adhesive 221 and the second gel optical adhesive 222 temporarily melt into a liquid state due to temperature rise and the first gel optical adhesive 221 and the second gel optical adhesive 222 will again flow naturally to conform to the shape of micro-slits, fill and penetrate each micro-slit again, and make all the junctions that originally existed between the first gel optical adhesive 221 and the second gel optical adhesive 222 disappear. The electrical first gel optical adhesive 221 and the conductive second gel optical adhesive 222 are re-melted and mixed together to form partially conductive gel optical adhesive layer 226 that is partially conductive, has a conductive path P, and has an EMI protective effect. In addition to bonding touch panel 130 and the display module 110, it can also be used as an EMI protection layer, as demostrated in FIG. 22.

The above embodiments can be arbitrarily combined or replaced with each other, so as to derive more implementations, but do not deviate from the scope of protection of this invention. For the definition of the scope of protection of this invention, the described scope of the patent application of this invention shall prevail. There are more embodiments provided as follows.

Embodiment 1: A touch screen, assembled by a bonding process, including: a display module including a frame and a displaying area; a touch panel configured above the display module and to receive a touch input; and a gel-based optical adhesive partially pre-cured prior to an implementation of the bonding process, interposed between and bonding the display module and the touch panel, and having a coverage larger than the displaying area and less than an outer edge of the frame and a ratio of transmittance larger than a percent of 91%.

Embodiment 2: The touch screen as described in Embodiment 1, further including one of components as follows: the display module including the frame around the displaying area and showing a series of dynamic images in the displaying area; and the touch panel further including a sensing area in correspondence with the displaying area in position.

Embodiment 3: The touch screen as described in Embodiment 1, wherein the gel-based optical adhesive has a volume resistivity of at least $8\times10^{15}$ Ω·cm, a surface resistivity at least $3\times10^{15}$ Ω·cm, a dielectric constant in a range between 2.79 and 2.81, and a peel strength in a range between 3.0 N/20 mm and 10 N/20 mm.

Embodiment 4: The touch screen as described in Embodiment 1, wherein the display module including the frame, the displaying area, and a height difference formed between the frame and the displaying area to collectively form a shallow recession part providing for the gel-based optical adhesive to fill in.

Embodiment 5: The touch screen as described in Embodiment 1, wherein the gel-based optical adhesive is further treated by a post-heating process with a post-heat temperature in a range between 50° C. and 65° C. lasting for a period of 15 to 30 minutes after the implementation of the bonding process.

Embodiment 6: A touch screen, assembled by a lamination process, including: a display module including a corner formed at where a frame and a displaying area are joined; a touch panel configured above the display module and to receive a touch input; a high-plasticity gel-based optical adhesive cured by a pre-curing process prior to the implementation of the lamination process; and a high-plasticity curing optical adhesive required to treat with a curing process after the implementation of the lamination process, filled in and around the corner, and sandwiched between the display module and the touch panel with the high-plasticity gel-based optical adhesive to render the display module and the touch panel bonded.

Embodiment 7: The touch screen as described in Embodiment 6, further including one of components as follows: the display module including the frame around the displaying area and showing a series of dynamic images in the displaying area, in which the frame has a level higher than that of the displaying area which forms a segment difference; and the touch panel including a sensing area in correspondence with the displaying area in position.

Embodiment 8: The touch screen as described in Embodiment 7, wherein the high-plasticity curing optical adhesive has a plasticity relatively higher than that of the high-plasticity gel-based optical adhesive and is filled in and around the segment difference and the corner.

Embodiment 9: The touch screen as described in Embodiment 6, wherein the high-plasticity curing optical adhesive includes one selected from a group consisting of principal ingredients in the high-plasticity gel-based optical adhesive, an organosilicon compound, an additive, and a combination thereof, and the additive further includes one selected from a group consisting of a room temperature curing adhesive, an ultraviolet curing adhesive, a thermal curing adhesive, a compound adhesive, and a combination thereof.

Embodiment 10: The touch screen as described in Embodiment 6, wherein the high-plasticity curing optical adhesive, the corner, the frame, and the displaying area collectively form a shallow recession for the high-plasticity gel-based optical adhesive to fill in.

Embodiment 11: The touch screen as described in Embodiment 6, wherein the high-plasticity curing optical adhesive and the high-plasticity gel-based optical adhesive collectively form a single layer of optical adhesive.

Embodiment 12: A touch screen, assembled by a bonding process, including: a display module including a corner formed at where a metal-made bezel and a displaying area are converged; a touch panel configured above the display module and to receive a touch input; a first gel-based optical adhesive partially cured in advance by a curing process prior to the implementation of the bonding process; and a second gel-based optical adhesive partially cured in advance by a curing process prior to the implementation of the bonding process, filled in and around the corner, and configured between the display module and the touch panel with the first gel-based optical adhesive to render the display module and the touch panel bonded.

Embodiment 13: The touch screen as described in Embodiment 12, wherein the first gel-based optical adhesive includes one selected from a group consisting of principal ingredients in the second gel-based optical adhesive, a conductive polymeric material, and a combination thereof, has properties of light transmittable and conductive, and provides an electrical conductivity for the displaying area on the display module.

Embodiment 14: The touch screen as described in Embodiment 12, wherein the second gel-based optical adhesive includes one selected from a group consisting of a graphene, a conductive polymeric material, and a combination thereof, to electrically connect the first gel-based optical adhesive with the metal-made bezel, so as to provides a ground electrical conductivity for the display module.

Embodiment 15: The touch screen as described in Embodiment 12, wherein the second gel-based optical adhesive has a property that is softer than the first gel-based optical adhesive and includes one selected from a group consisting of principal ingredients in the first gel-based optical adhesive, a hardening agent, a hardener, and a combination thereof, and the second gel-based optical adhesive has a property that is harder than the first gel-based optical adhesive after treated with a hardening process.

Embodiment 16: The touch screen as described in Embodiment 12, wherein the first gel-based optical adhesive and the second gel-based optical adhesive collectively form a single layer of optical adhesive.

Embodiment 17: The touch screen as described in Embodiment 12, further including: a conductive layer formed above an optical adhesive surface that is collectively formed by the first gel-based optical adhesive and the second gel-based optical adhesive, and configured between the display module and the touch panel to provide a ground electrical conductivity for the display module.

Embodiment 18: The touch screen as described in Embodiment 17, wherein the conductive layer is formed on the optical adhesive surface by implementing a process selected from a group consisting of an inkjet process, a spray-coating process, a dip-coating process, and a combination thereof, and includes one selected from a group consisting of a gel-based optical adhesive, a conductive polymeric material, a graphene, and a combination thereof.

Embodiment 19: The touch screen as described in Embodiment 17, wherein the first gel-based optical adhesive, the second gel-based optical adhesive, and the metal-made bezel collectively form a conductive path to provide a ground electrical conductivity for the display module.

Embodiment 20: The touch screen as described in Embodiment 17, wherein the conductive layer, the second gel-based optical adhesive, and the metal-made bezel collectively form a conductive path to provide a ground electrical conductivity for the display module.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A touch screen, assembled by a bonding process, comprising:
    a display module comprising a frame and a displaying area;
    a touch panel configured above the display module and to receive a touch input; and
    a gel-based optical adhesive partially pre-cured prior to an implementation of the bonding process, interposed between and bonding the display module and the touch panel, and having a coverage larger than the displaying area and less than an outer edge of the frame and a ratio of transmittance larger than a percent of 91%,
    wherein the gel-based optical adhesive has a volume resistivity of at least $8 \times 10^{15}$ $\Omega \cdot cm$, a surface resistivity at least $3 \times 10^{15}$ $\Omega \cdot cm$, a dielectric constant in a range between 2.79 and 2.81, and a peel strength in a range between 3.0 N/20 mm and 10 N/20 mm.

2. The touch screen as claimed in claim 1, further comprising one of components as follows:
    the display module comprising the frame around the displaying area and showing a series of dynamic images in the displaying area; and
    the touch panel further comprising a sensing area in correspondence with the displaying area in position.

3. The touch screen as claimed in claim 1, wherein the display module comprising the frame, the displaying area, and a height difference formed between the frame and the displaying area to collectively form a shallow recession part providing for the gel-based optical adhesive to fill in.

4. The touch screen as claimed in claim 1, wherein the gel-based optical adhesive is further treated by a post-heating process with a post-heat temperature in a range between 50° C. and 65° C. lasting for a period of 15 to 30 minutes after the implementation of the bonding process.

5. A touch screen, assembled by a lamination process, comprising:
- a display module comprising a corner formed at where a frame and a displaying area are joined;
- a touch panel configured above the display module and to receive a touch input;
- a high-plasticity gel-based optical adhesive cured by a pre-curing process prior to the implementation of the lamination process; and
- a high-plasticity curing optical adhesive required to treat with a curing process after the implementation of the lamination process, filled in and around the corner, and sandwiched between the display module and the touch panel with the high-plasticity gel-based optical adhesive to render the display module and the touch panel bonded,
- wherein the high-plasticity gel-based optical adhesive has a volume resistivity of at least $8 \times 10^{15}$ Ω·cm, a surface resistivity at least $3 \times 10^{15}$ Ω·cm, a dielectric constant in a range between 2.79 and 2.81, and a peel strength in a range between 3.0 N/20 mm and 10 N/20 mm.

6. The touch screen as claimed in claim 5, further comprising one of components as follows:
- the display module comprising the frame around the displaying area and showing a series of dynamic images in the displaying area, in which the frame has a level higher than that of the displaying area which forms a segment difference; and
- the touch panel comprising a sensing area in correspondence with the displaying area in position.

7. The touch screen as claimed in claim 6, wherein the high-plasticity curing optical adhesive has a plasticity relatively higher than that of the high-plasticity gel-based optical adhesive and is filled in and around the segment difference and the corner.

8. The touch screen as claimed in claim 5, wherein the high-plasticity curing optical adhesive comprises one selected from a group consisting of principal ingredients in the high-plasticity gel-based optical adhesive, an organosilicon compound, an additive, and a combination thereof, and the additive further comprises one selected from a group consisting of a room temperature curing adhesive, an ultraviolet curing adhesive, a thermal curing adhesive, a compound adhesive, and a combination thereof.

9. The touch screen as claimed in claim 5, wherein the high-plasticity curing optical adhesive, the corner, the frame, and the displaying area collectively form a shallow recession for the high-plasticity gel-based optical adhesive to fill in.

10. The touch screen as claimed in claim 5, wherein the high-plasticity curing optical adhesive and the high-plasticity gel-based optical adhesive collectively form a single layer of optical adhesive.

11. A touch screen, assembled by a bonding process, comprising:
- a display module comprising a corner formed at where a metal-made bezel and a displaying area are converged;
- a touch panel configured above the display module and to receive a touch input;
- a first gel-based optical adhesive partially cured in advance by a curing process prior to the implementation of the bonding process; and
- a second gel-based optical adhesive partially cured in advance by a curing process prior to the implementation of the bonding process, filled in and around the corner, and configured between the display module and the touch panel with the first gel-based optical adhesive to render the display module and the touch panel bonded,
- wherein the first and second gel-based optical adhesives have a volume resistivity of at least $8 \times 10^{15}$ Ω·cm, a surface resistivity at least $3 \times 10^{15}$ Ω·cm, a dielectric constant in a range between 2.79 and 2.81, and a peel strength in a range between 3.0 N/20 mm and 10 N/20 mm.

12. The touch screen as claimed in claim 11, wherein the first gel-based optical adhesive comprises one selected from a group consisting of principal ingredients in the second gel-based optical adhesive, a conductive polymeric material, and a combination thereof, has properties of light transmittable and conductive, and provides an electrical conductivity for the displaying area on the display module.

13. The touch screen as claimed in claim 11, wherein the second gel-based optical adhesive comprises one selected from a group consisting of a graphene, a conductive polymeric material, and a combination thereof, to electrically connect the first gel-based optical adhesive with the metal-made bezel, so as to provides a ground electrical conductivity for the display module.

14. The touch screen as claimed in claim 11, wherein the second gel-based optical adhesive has a property that is softer than the first gel-based optical adhesive and comprises one selected from a group consisting of principal ingredients in the first gel-based optical adhesive, a hardening agent, a hardener, and a combination thereof, and the second gel-based optical adhesive has a property that is harder than the first gel-based optical adhesive after treated with a hardening process.

15. The touch screen as claimed in claim 11, wherein the first gel-based optical adhesive and the second gel-based optical adhesive collectively form a single layer of optical adhesive.

16. The touch screen as claimed in claim 11, further comprising:
- a conductive layer formed above an optical adhesive surface that is collectively formed by the first gel-based optical adhesive and the second gel-based optical adhesive, and configured between the display module and the touch panel to provide a ground electrical conductivity for the display module.

17. The touch screen as claimed in claim 16, wherein the conductive layer is formed on the optical adhesive surface by implementing a process selected from a group consisting of an inkjet process, a spray-coating process, a dip-coating process, and a combination thereof, and comprises one selected from a group consisting of a gel-based optical adhesive, a conductive polymeric material, a graphene, and a combination thereof.

18. The touch screen as claimed in claim 16, wherein the first gel-based optical adhesive, the second gel-based optical adhesive, and the metal-made bezel collectively form a conductive path to provide a ground electrical conductivity for the display module.

19. The touch screen as claimed in claim 16, wherein the conductive layer, the second gel-based optical adhesive, and the metal-made bezel collectively form a conductive path to provide a ground electrical conductivity for the display module.

* * * * *